United States Patent
Knies et al.

(10) Patent No.: US 9,477,628 B2
(45) Date of Patent: Oct. 25, 2016

(54) COLLECTIVE COMMUNICATIONS APPARATUS AND METHOD FOR PARALLEL SYSTEMS

(71) Applicant: INTEL CORPORATION, Santa Clara, CA (US)

(72) Inventors: Allan D. Knies, Burlingame, CA (US); David Pardo Keppel, Seattle, WA (US); Dong Hyuk Woo, Campbell, CA (US); Joshua B. Fryman, Corvallis, OR (US)

(73) Assignee: Intel Corporation, Santa Clara, CA (US)

( * ) Notice: Subject to any disclaimer, the term of this patent is extended or adjusted under 35 U.S.C. 154(b) by 261 days.

(21) Appl. No.: 14/040,676

(22) Filed: Sep. 28, 2013

(65) Prior Publication Data

US 2015/0095542 A1  Apr. 2, 2015

(51) Int. Cl.
| | |
|---|---|
| G06F 15/00 | (2006.01) |
| G06F 13/40 | (2006.01) |
| G06F 15/173 | (2006.01) |
| G06F 9/52 | (2006.01) |
| G06F 13/14 | (2006.01) |

(52) U.S. Cl.
CPC ............. *G06F 13/4068* (2013.01); *G06F 9/52* (2013.01); *G06F 15/17318* (2013.01); *G06F 15/17325* (2013.01)

(58) Field of Classification Search
CPC ......... G06F 15/00; G06F 13/14; G06F 13/00
USPC ................. 712/16, 28, 10; 710/305
See application file for complete search history.

(56) References Cited

U.S. PATENT DOCUMENTS

| | | | | |
|---|---|---|---|---|
| 5,418,915 A | * | 5/1995 | Matuda | G06F 9/30181 708/524 |
| 5,649,106 A | * | 7/1997 | Tsujimichi | G06F 15/173 345/505 |
| 8,458,411 B2 | * | 6/2013 | Akaike | G06F 9/52 711/150 |
| 2003/0088601 A1 | * | 5/2003 | Pitsianis | G06F 9/30032 708/622 |
| 2003/0172221 A1 | * | 9/2003 | McNeil | G06F 15/8023 710/305 |
| 2005/0240936 A1 | * | 10/2005 | Jones | G06F 8/4442 718/107 |
| 2010/0274997 A1 | | 10/2010 | Archer et al. | |
| 2015/0007319 A1 | * | 1/2015 | Antonov | G06F 21/56 726/23 |
| 2015/0205888 A1 | * | 7/2015 | He | G06F 9/455 703/22 |

FOREIGN PATENT DOCUMENTS

| | | |
|---|---|---|
| WO | 2006020298 A2 | 2/2006 |
| WO | 2006020298 A3 | 2/2006 |

* cited by examiner

*Primary Examiner* — Christopher Shin
(74) *Attorney, Agent, or Firm* — Nicholson De Vos Webster & Elliott LLP

(57) ABSTRACT

A collective communication apparatus and method for parallel computing systems. For example, one embodiment of an apparatus comprises a plurality of processor elements (PEs); collective interconnect logic to dynamically form a virtual collective interconnect (VCI) between the PEs at runtime without global communication among all of the PEs, the VCI defining a logical topology between the PEs in which each PE is directly communicatively coupled to a only a subset of the remaining PEs; and execution logic to execute collective operations across the PEs, wherein one or more of the PEs receive first results from a first portion of the subset of the remaining PEs, perform a portion of the collective operations, and provide second results to a second portion of the subset of the remaining PEs.

25 Claims, 13 Drawing Sheets

COLLECTIVE COMMUNICATIONS APPARATUS AND METHOD FOR PARALLEL SYSTEMS

This invention was made with Government support under contract number B600738 awarded by the Department of Energy. The Government has certain rights in this invention.

BACKGROUND

1. Field of the Invention

This invention relates generally to the field of computer processors. More particularly, the invention relates to a collective communication apparatus and method for parallel systems.

2. Description of the Related Art

Collective operations are a common and critical operation in parallel applications. Examples of collectives include, but are not limited to: reductions, all-reductions (reduce-2-all), broadcasts, barriers, and parallel prefix operations. When collectives are implemented purely in software, they suffer from significant slowdowns, serialization, inefficiency of data movement, and require a large number of instructions to execute. When collectives are implemented solely in hardware, the formation, creation, and disbanding are substantially limited to what the hardware designer allows.

Collective operations require many small messages and often require barriers after setting up participating cores and before the first operation can take place, these barriers can limit overall application performance. Such protocols can be so onerous that some software is written to avoid these operations altogether—even changing algorithms to do so. However, collectives represent an abstraction that is natural to the programmer and that can provide an efficient means to communicate amongst a pool of processors.

Another aspect of collectives is that even with hardware support, they are slow compared to local computation, and introduce delays due to load imbalance and communication latency. As such, avoiding explicit waits and barriers across the collective are keys to efficiency.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
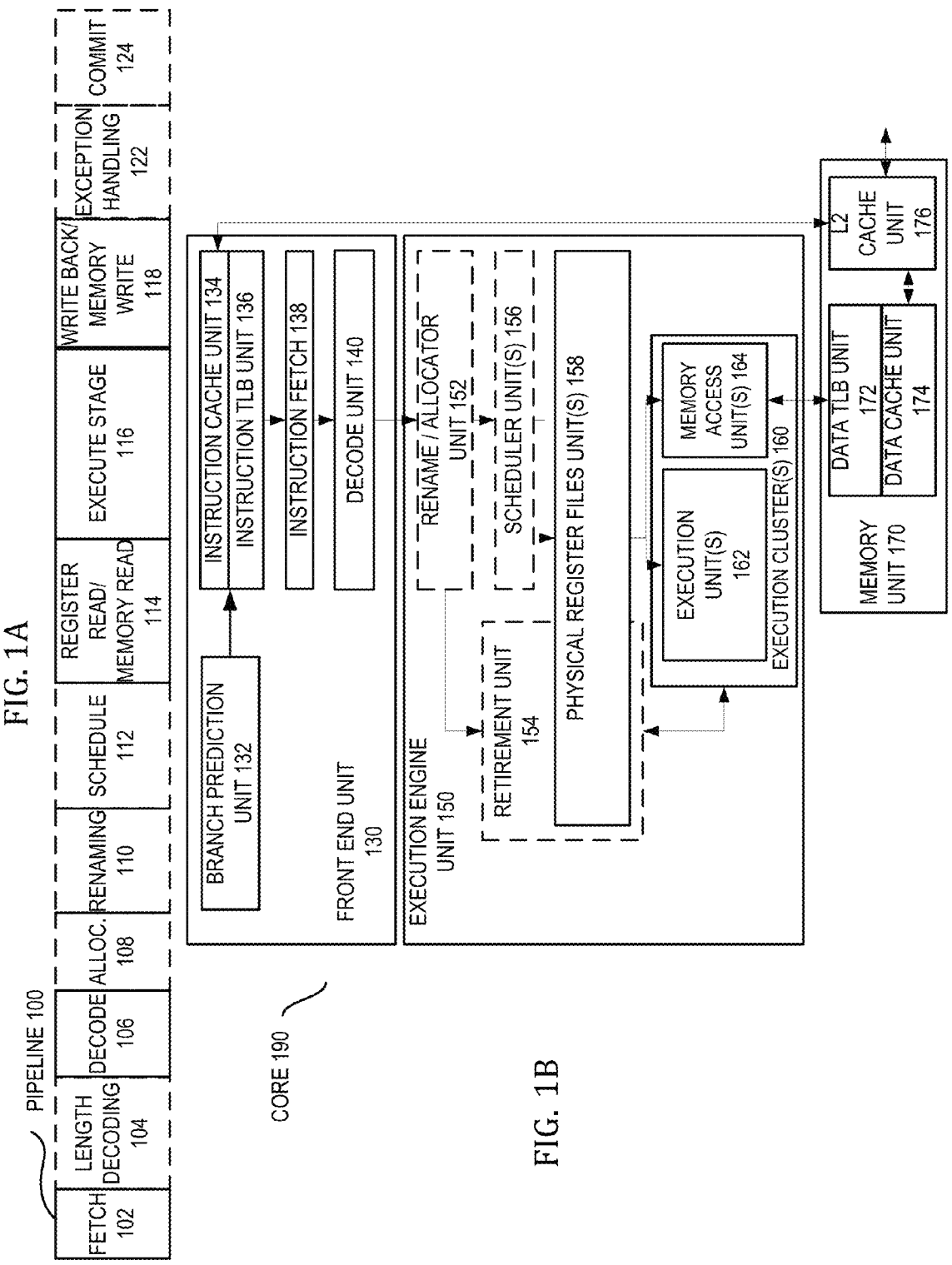
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
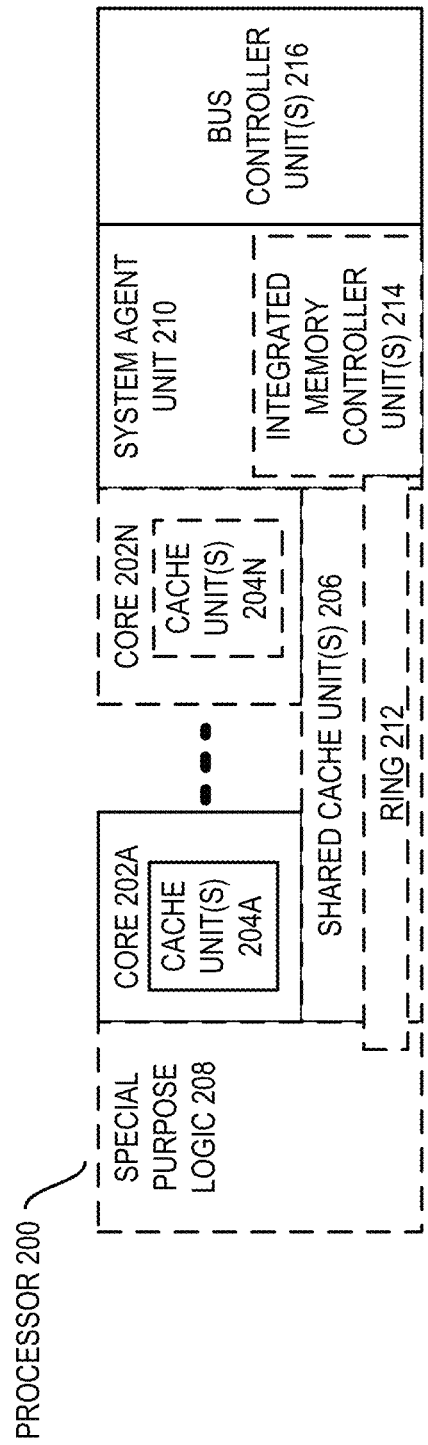
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
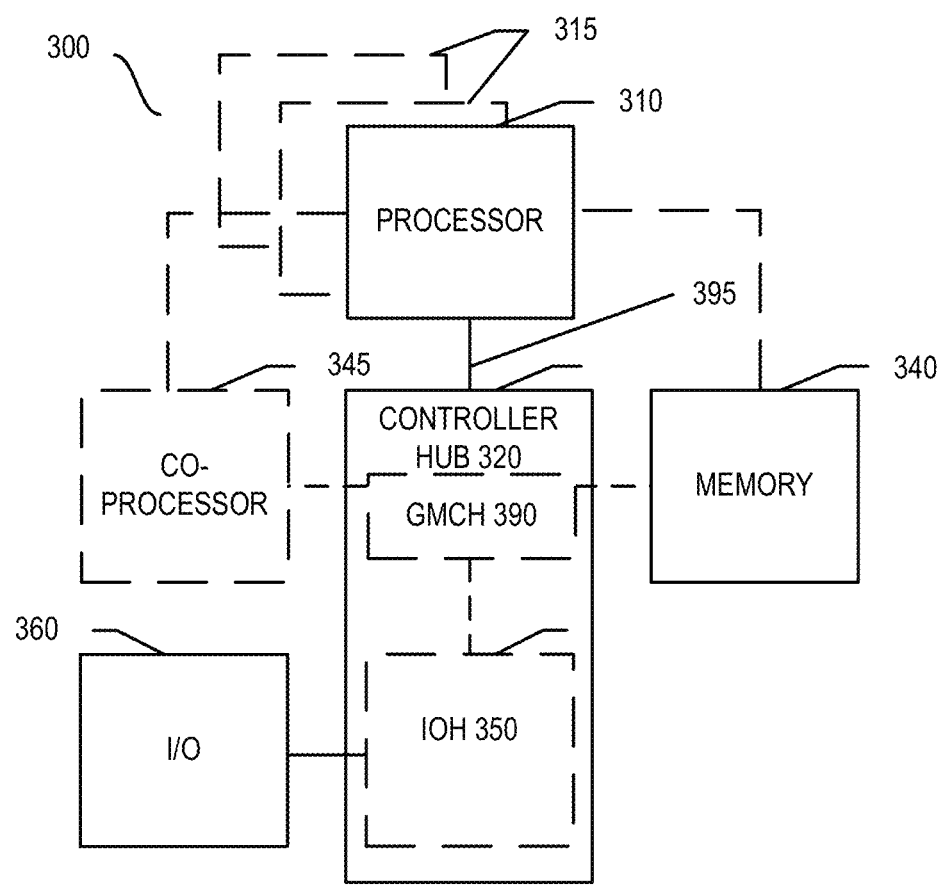
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
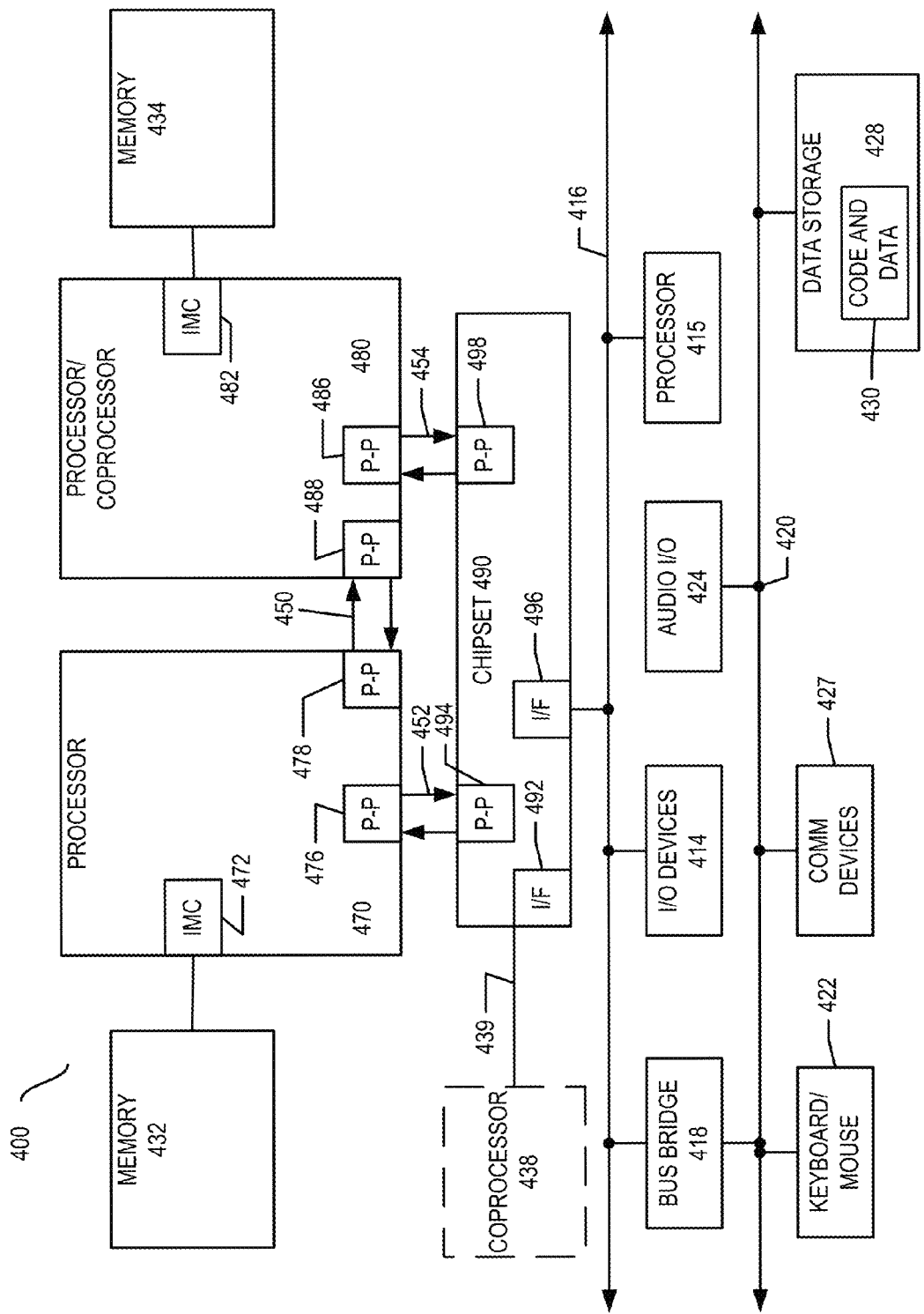
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488.

Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
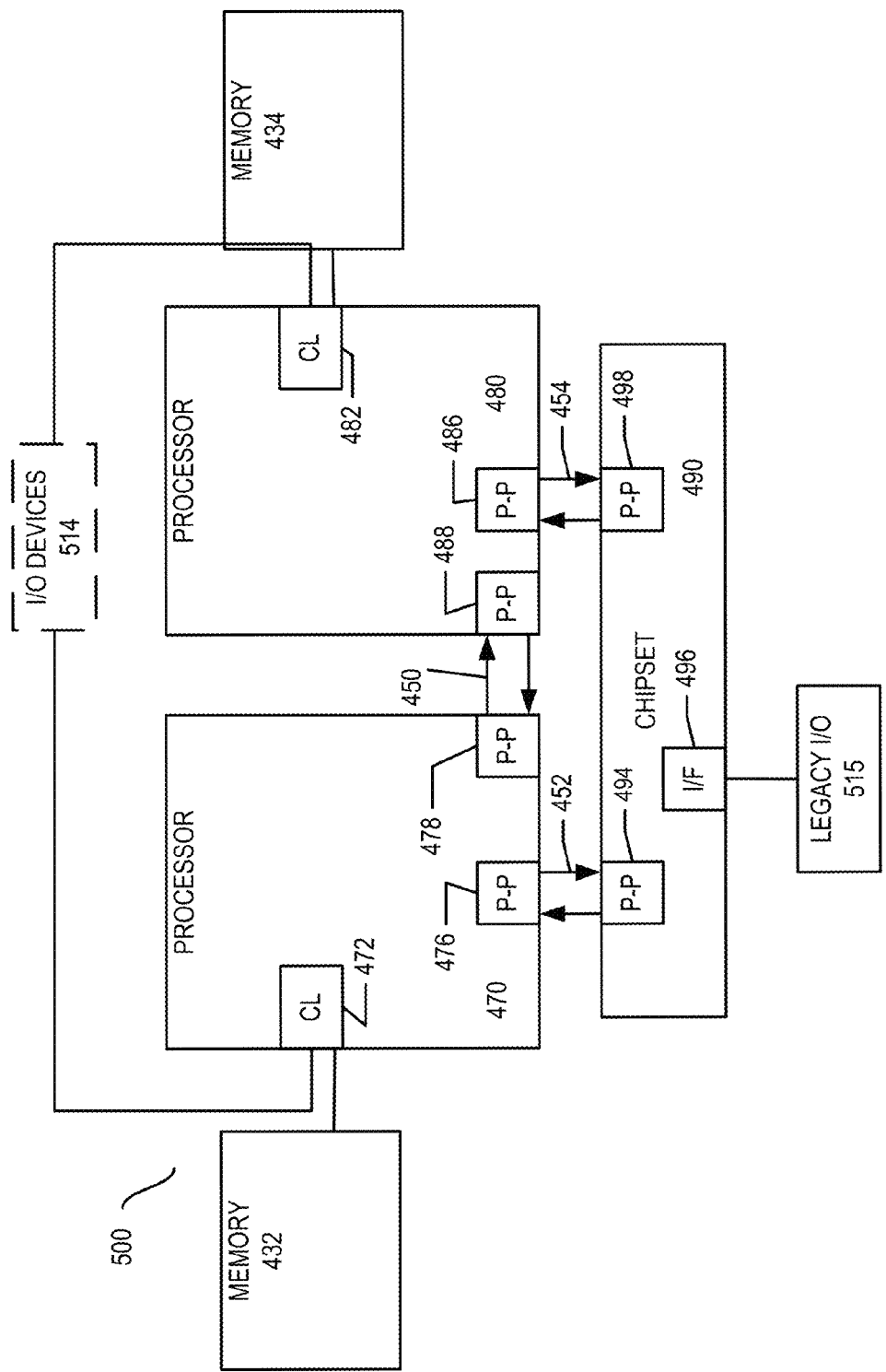
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
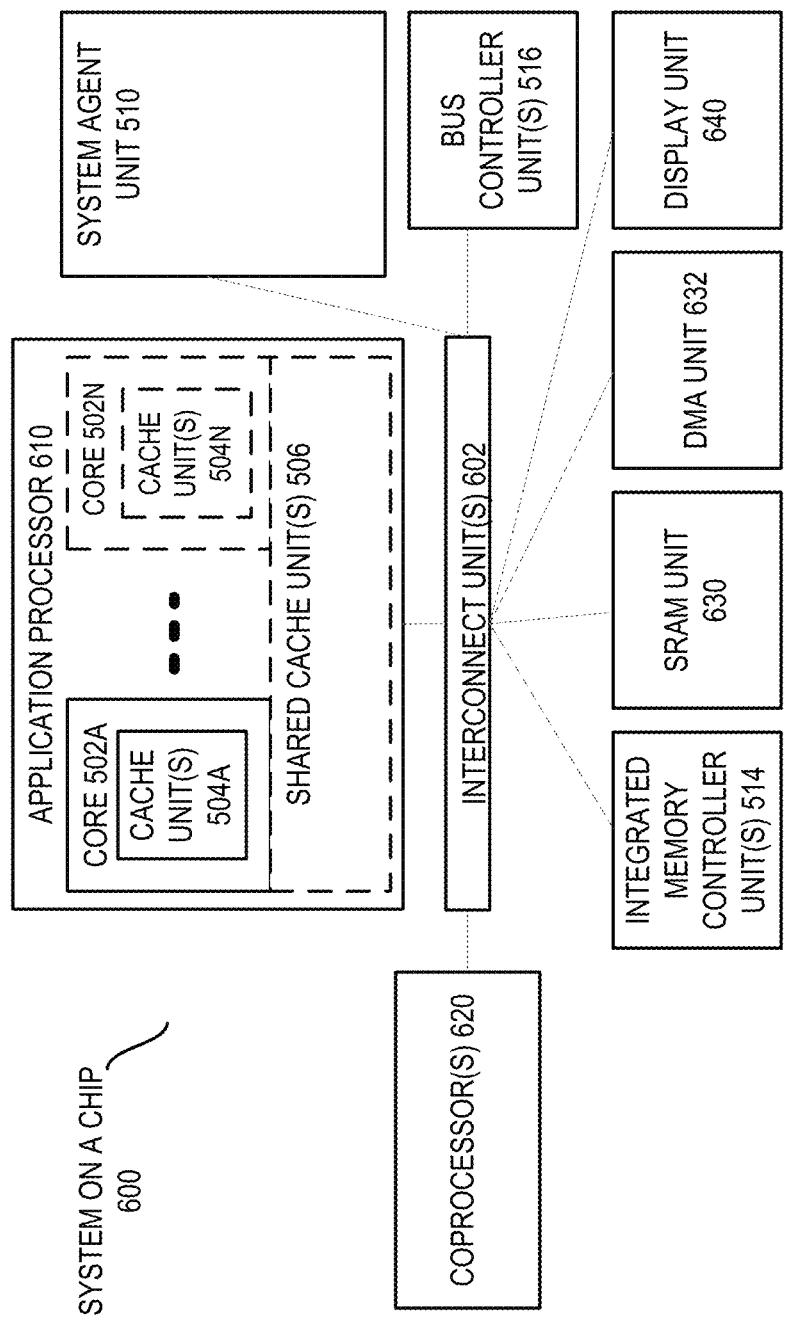
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
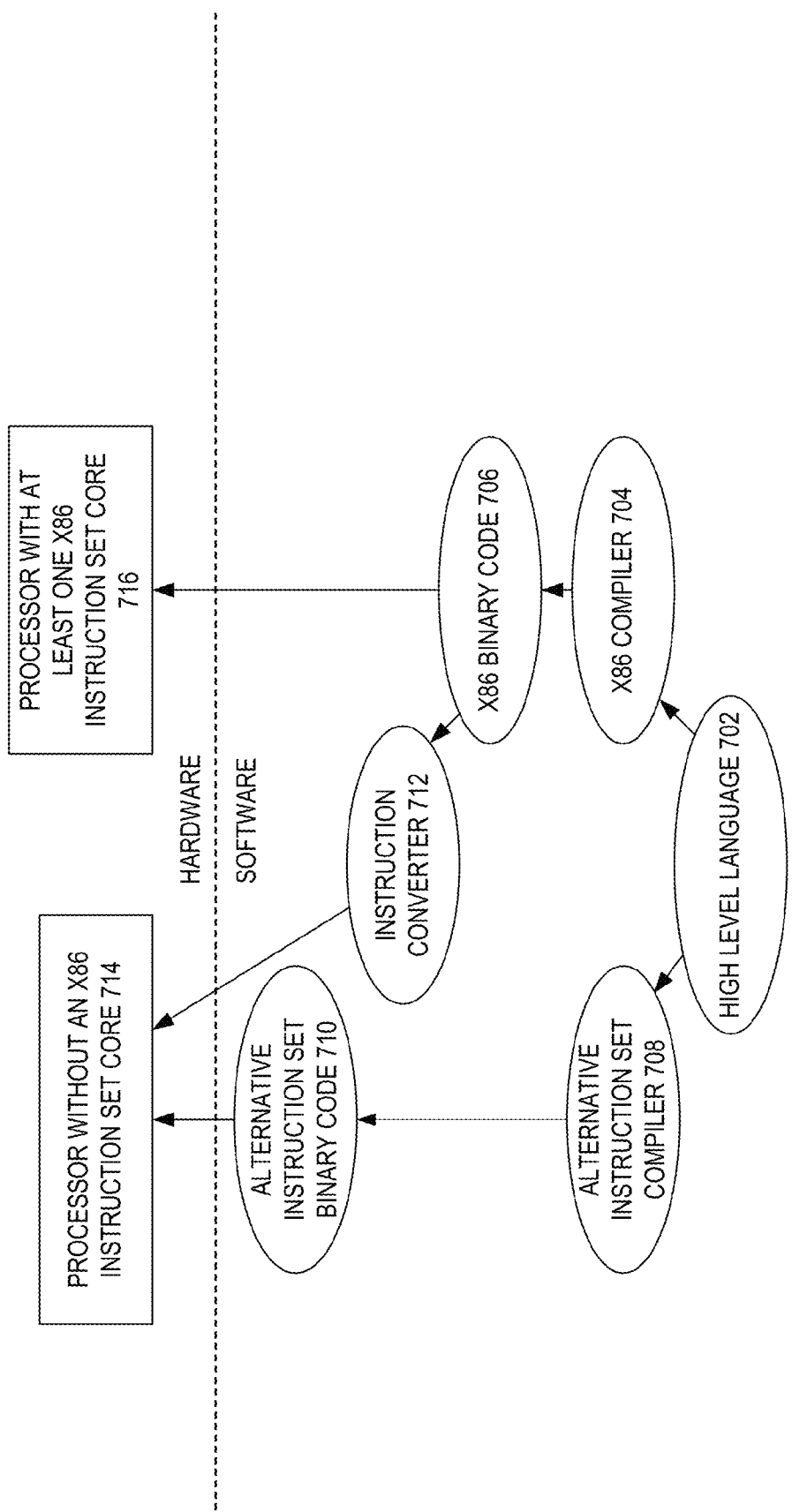
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Collective Communications Apparatus and Method for Parallel Systems

One embodiment of the invention allows collections of cores, processors, or other types of processing elements (PEs) (e.g., graphics processing units, application-specific hardware, functional units within a processing device, etc) to be formed, modified, and collective operations commenced without global communication between all of the PEs and using a small, constant amount of buffering state per PE. This means that collectives on large machines can be implemented using the same number of internal registers and without access to or interference with a large memory (such as DRAM or on-chip cache/coherence) as a small machine. In one embodiment, the collectives are fast, flexible, low-latency, asynchronous, able to tolerate significant load imbalance, and barriers or other global synchronizations are not required to form, initiate, or disband a collective. One embodiment provides the ability to quickly form (setup) and disband (teardown) arbitrary sub-collections of PEs, provides for efficient mapping of jobs to PEs, and of mapping subtasks of jobs to subsets of PEs. There may generally be several simultaneous collectives, setups, teardowns, and so on but when they use disjoint resources (do not interact) we simplify the discussion by only considering those relevant to the operation being described. In the following text, "all PEs" implies all PEs involved in the operation being discussed."

Figure 8:
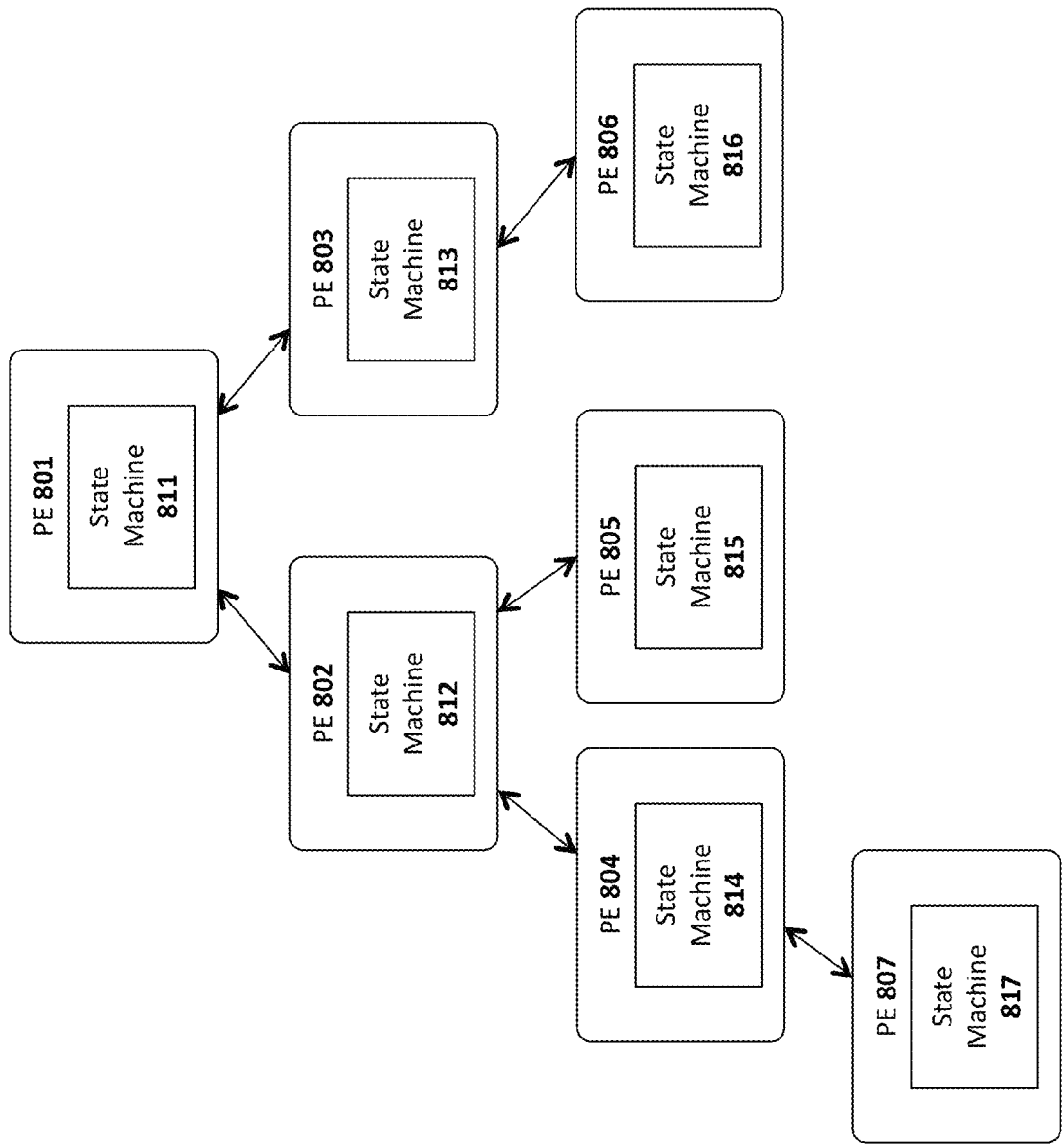
FIG. 8 illustrates one embodiment comprising a logical arrangement of processing elements (PEs)

As illustrated in FIG. 8, these goals are accomplished in one embodiment using a state machine 811-817 at each PE 801-807, respectively, that connects logically to one or more "child" PEs and a "parent" PE, resulting in a logical binary tree organization. In one embodiment, a PE waits until all child PEs and the PE itself have provided values, computes the local collective operation, and then passes the result to the parent PE. By way of example, PE 802 calculates its local collective operation once it receives values from its child PEs 804 and 805. It then uses the values from PEs 804 and 805, and its own value to perform the local collective operation and sends the result of the local collective operation to its parent PE 801. In this manner, collective results ripple up the tree structure from child PEs (also sometimes referred to as "leaf" PEs) through parent PEs until the top parent PE 801 is reached.

Software can arrange any PEs in any topology to perform collective operations. When software groups PEs for a collective, one PE is designated the "root" PE. In this example, the top parent PE 801 is a designated root PE which does not have a parent but receives values from its child PEs 802 and 803 (which have been computed using results from the other child PEs 804-807). The root PE 801 computes the collective value and optionally broadcasts it back towards the child PEs 802-807 (if the desired collective operation requires it). Each PE 801-807 receiving a value from a parent forwards it to its children and also holds it locally until software asks for the value.

In one embodiment, the hardware state machine 811-817 within each PE 801-807, respectively, implements the collective operations and inter-PE communications described herein. Each state machine 811-817 may be controlled by a dedicated set of instructions, some examples of which are described below. Moreover, each state machine 811-817 may run asynchronously from instructions executed on the main execution pipeline in PEs 801-807, respectively.

Figure 9:
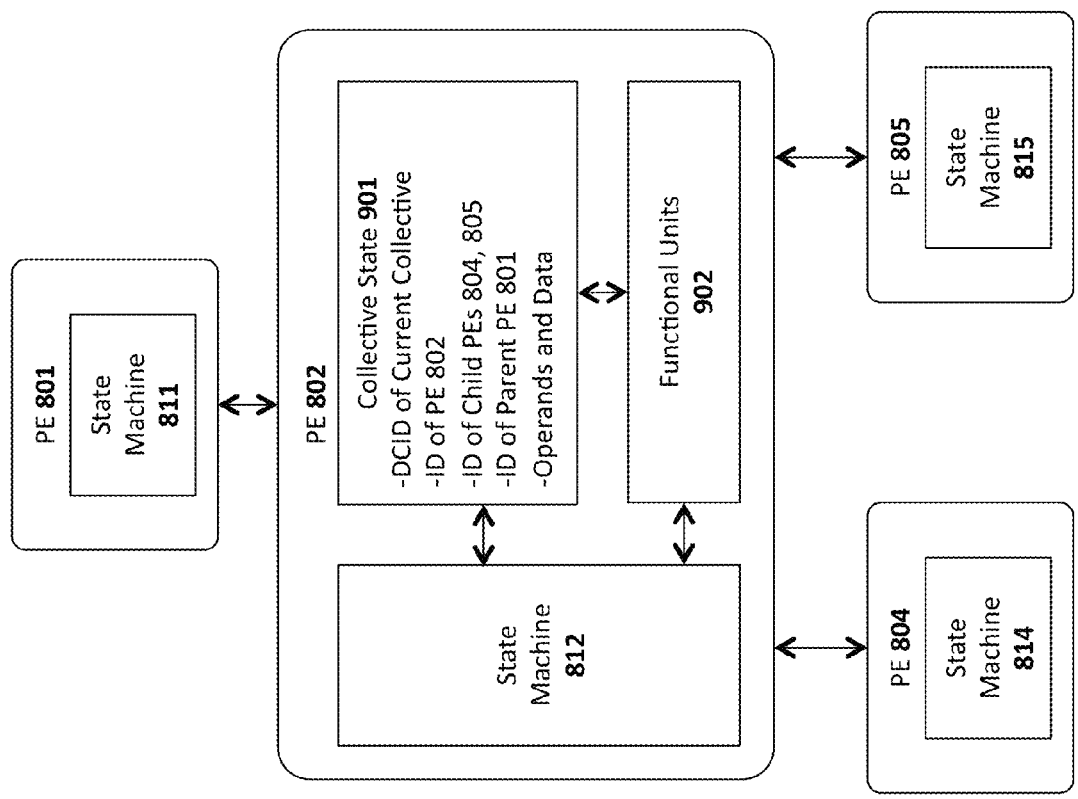
FIG. 9 illustrates state information used for collective operations in one embodiment.

As illustrated in FIG. 9, the collective state 901 of each PE participating in a collective operation is maintained using a relatively small amount of register/buffer storage. In one embodiment, the amount of register/buffer storage is the same, regardless of how many collectives are in flight and how many cores are in the collective. The collective state 901 may include a dynamic collective ID (DCID) selected by software to identify a sequence number for the currently executing collective operation on this PE; an ID of the PE itself 802; an ID of any child PEs 804, 805; and an ID of any parent PE 801 (as indicated in FIG. 9). In one embodiment, each of the IDs comprises an integer value to uniquely identify each PE and each collective in the system. In addition, the collective state 901 may include the collective operands and data (e.g., collective results). Also illustrated in FIG. 9 are functional units 902 for executing the various operations required by the collective (as well as other instructions supported by the PE ISA) and responsively updating the current state 901 within the register/buffer storage.

The instructions and state machine described herein can easily be implemented as an addition to nearly any type of instruction set architecture (ISA), core, and memory system (e.g., cachable, uncachable, coherent, multiprogrammed, user-level, supervisor level, etc). No access or interference with the memory semantics of the system is required. The interconnect fabric simply needs to be used to uniquely identify all PEs (e.g., 'cores') on the network and pass messages directly from state machine to state machine on the PEs.

It should be noted that the arrangement of PEs shown in FIGS. 8-9 represent the logical interconnections between PEs, not physical interconnections. As discussed below, in one embodiment, the logical interconnections are programmed into each PE via instructions used to establish a virtual collective interconnect (VCI) between the PEs. The physical interconnections may be implemented using any type of fabric or bus structure for connecting multiple cores, processors, or other types of PEs (e.g., such as those discussed with respect to FIGS. 4-6). Although there is no dependence on any particular interconnect topology for this invention to properly function, person skilled in the art will understand that certain mappings of the tree topology to PEs will optimize the behavior.

The embodiments of the invention described herein may be used to perform various types of collective operations including reductions, all-reductions, broadcasts, barriers, and parallel prefixes, to name a few. As is well understood by those of skill in the art, a reduction performs operations on all values spread across all PEs and an all-reduction effectively performs a reduction where all PEs get a copy of the result. A broadcast causes data to be broadcast from one PE to all or a subset of PEs. A barrier forces all PEs to reach a common point in execution before all can proceed (i.e., forces a rendezvous between PEs). A Parallel prefix is a broad class of instructions in which a cumulative sum of a sequence of numbers $x_0, x_1, x_2, \ldots$ is used to compute a second sequence of numbers $y_0, y_1, y_2, \ldots$, the sums of prefixes (running totals) of the input sequence: $y_0=x_0$; $y_1=x_0+x_1$; and $y_2=x_0+x_1+x_2$.

All of the foregoing operations and various permutations of the operations are well understood by those of skill in the art. Moreover, it should be noted that while the foregoing operations are provided for the sake of illustration, the underlying principles of the invention are not limited to any particular set of collective operations.

The following components are employed to implement one embodiment of the invention:

(1) A set of instructions (ISA) to program and query the state machine on each PE.

(2) A small fixed amount of dedicated state per PE for state machine bookkeeping and for buffering and receiving collectives messages from other PEs. As mentioned, the state size per PE may be constant, regardless of the size of the machine and the number of collectives simultaneously "in flight" in the system.

(3) A fixed-dimension virtual collective interconnect (VCI) whose participating PEs and parent/child relationships are determined by software using the instructions provide, used by PEs to communicate in a sequence of collectives. In one embodiment the VCI comprises the logical binary tree arrangement such as illustrated in FIG. 8. As mentioned, the interconnects between the VCI are logical rather than physical. A physical network need not have physical channels mapping directly to VCI channels. Each state machine (hardware protocol) runs asynchronously from PE instructions, and is controlled by dedicated processor instructions. The hardware protocol performs handshakes and communications without global synchronization. The protocol supports a PE attempting to talk to another PE that is not yet ready to participate in a collective.

(4) A software protocol that guarantees to hardware certain interactions and requests occur at specific times. Primary in this protocol is a sequence to setup and teardown a collective, and software's responsibility to provide unique identifiers to collectives within the machine for groups of PEs that may communicate at some point. This sequence is an example of a typical ISA and SW protocol, although other comparable sequences could be designed by those that are skilled in the art that would accomplish effectively identical outcomes.

Below are a set of instructions used to implement one embodiments of the invention described herein. Note that none of the instructions except for wait require communication between PEs to complete. They only interact with the local state machine, which performs operations on the instruction's behalf. Wait only requires communication when the collective state machine has not yet completed communications needed for wait.

Initialize initializes the collective system once at application or system startup. After this instruction, SW must ensure that all PEs come to a barrier if they are to eventually participate in a collective. This single global barrier is the only one ever required and SW must implement this barrier using means other than the collective hardware.

Setup arranges cores in a binary tree in one embodiment, but someone skilled in the art could generalize to a variety of alternate interconnection patterns. For each PE, the IDs of 0, 1, or 2 neighboring "child" PEs and 0 or 1 "parent" PEs. Setup also specifies the collective operation to be performed (e.g., reduction, broadcast, barrier, allreduce, parallel prefix, etc), and the computational operation (add, or, xor, mul, etc). Software issues setup for any change in topology or operation of the collective. In addition, setup chooses the dynamic collective ID (DCID), a unique ID shared by all PEs in a collective. Every PE in a given collective calls setup with the same DCID. Although in this embodiment the setup instruction specifies the operation, it is feasible for those skilled in the art to define similar protocols where the operation is specified in other instructions in the protocol.

Initiate indicates that the local PE is ready to begin participating in the collective operation and supplies its input (if any) for the operation. For some operations, only one PE executes initiate (broadcast); for others (reduction, barrier, and allreduce), software must initiate on all PEs in the collective.

Wait may be called by software when it needs to know if a collective operation (specified by a particular DCID) has completed. Wait retrieves any result or partial result from the operation and writes it to a processor register. All PEs must wait to complete a collective operation.

Next is used to allow a sequence of collective operations to be pipelined on the same topology and operation. In response, it causes the hardware to generate a new DCID based on the unique DCID given in setup (e.g., incrementing to a next value). A subsequent initiate instruction uses the DCID returned by next.

Teardown is called to deallocate/deactivate the collective operation when software is done with a collective.

Typical use is shown in the figure below. Application work not related to collective operation would appear various places in this sequence but is not shown.

```
initialize
<barrier> // only done once at application or system startup.
repeat
    setup <DCID> <child PEs> <parent PE> <operation>
    Repeat // pipeline a series of collectives in a wavefront
        initiate <DCID> <my value>
        wait partial_result, <DCID> // writes to "partial_result"
        next newDCID, <DCID> // writes to "newDCID"
    Until executed all the collectives that share the same type and VCI
    teardown <DCID> // mark this collective as free for other users
Until done with collectives
```

One exemplary embodiment of the variables used to define the collective state 901 is as follows:

```
Struct collective_state { }{
        Buff_t incoming_parent, incoming_child1,
incoming_child2; //buff_t is a machine-specific sized register
to hold incoming collective messages
(e.g., sufficient bytes to hold one or more messages depending on
the specific implementation)
        Integer parent_core_id, child1_core_id, child2_core_id;
        64b_val partial_result; // holds final or partial results
rippling through the binary tree; could be integer or floating point
        Struct dcid { }{
            Int slot; // if core supports more than one collective
state machine, each may be specified by a "slot" value
            Int dcid_tag; // unique DCID value supplied by
software during setup
        }
        Int reduction_operand_bitvector, reduction_ack_bitvector,
broadcast_operand_bitvector, reduction_operand_bitvector;
        // examples of counters used by the state machine to track
messages and acknowledgements
    }
```

In one embodiment, the virtual collective interconnect (VCI) is stored in a distributed manner in which each PE holds the parent and child PE numbers that globally comprise a binary tree. No one PE needs to know the entire extent of the collective—only the IDs of their direct parent and child PEs (if any). As mentioned, the "root" PE (e.g., PE 801 in FIG. 8) has no parent, and PEs at the edges, such as PE 807, may have 0 leaves. In total, the collection of all the parent and child PE ID fields in the collective state 901 define the virtual interconnect topology and membership in each collective.

In one embodiment, asynchronous, pipelined collective operation is achieved by the operation of the state machines 811-817. The state machines 811-817 may be implemented in dedicated hardware in each PE and execute the collective operations in the background (i.e., as the PEs process other instructions unrelated to the collective).

Figure 10A:
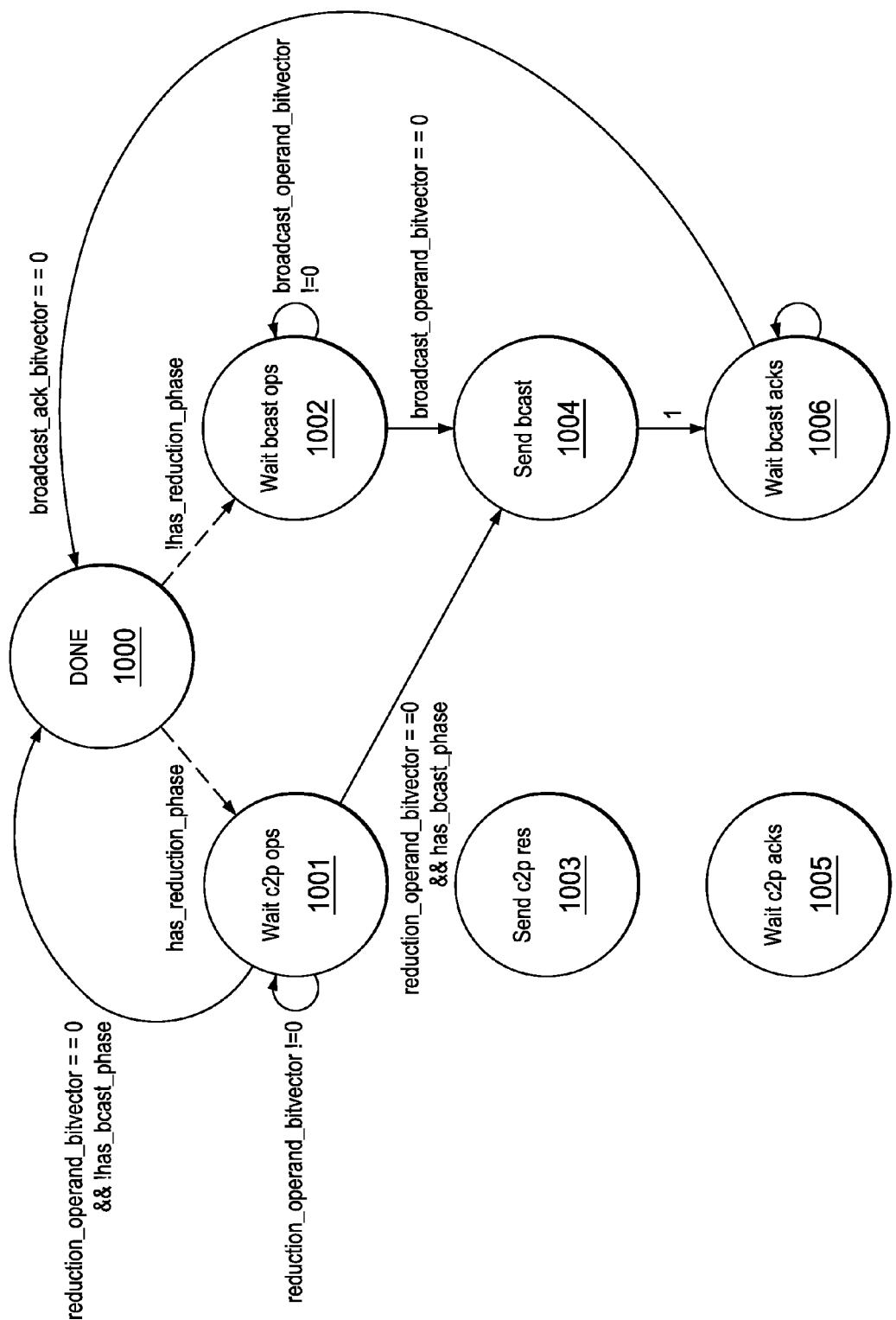
FIG. 10A-C illustrate state machine operation for PEs at various positions in the logical arrangement.
Figure 10B:
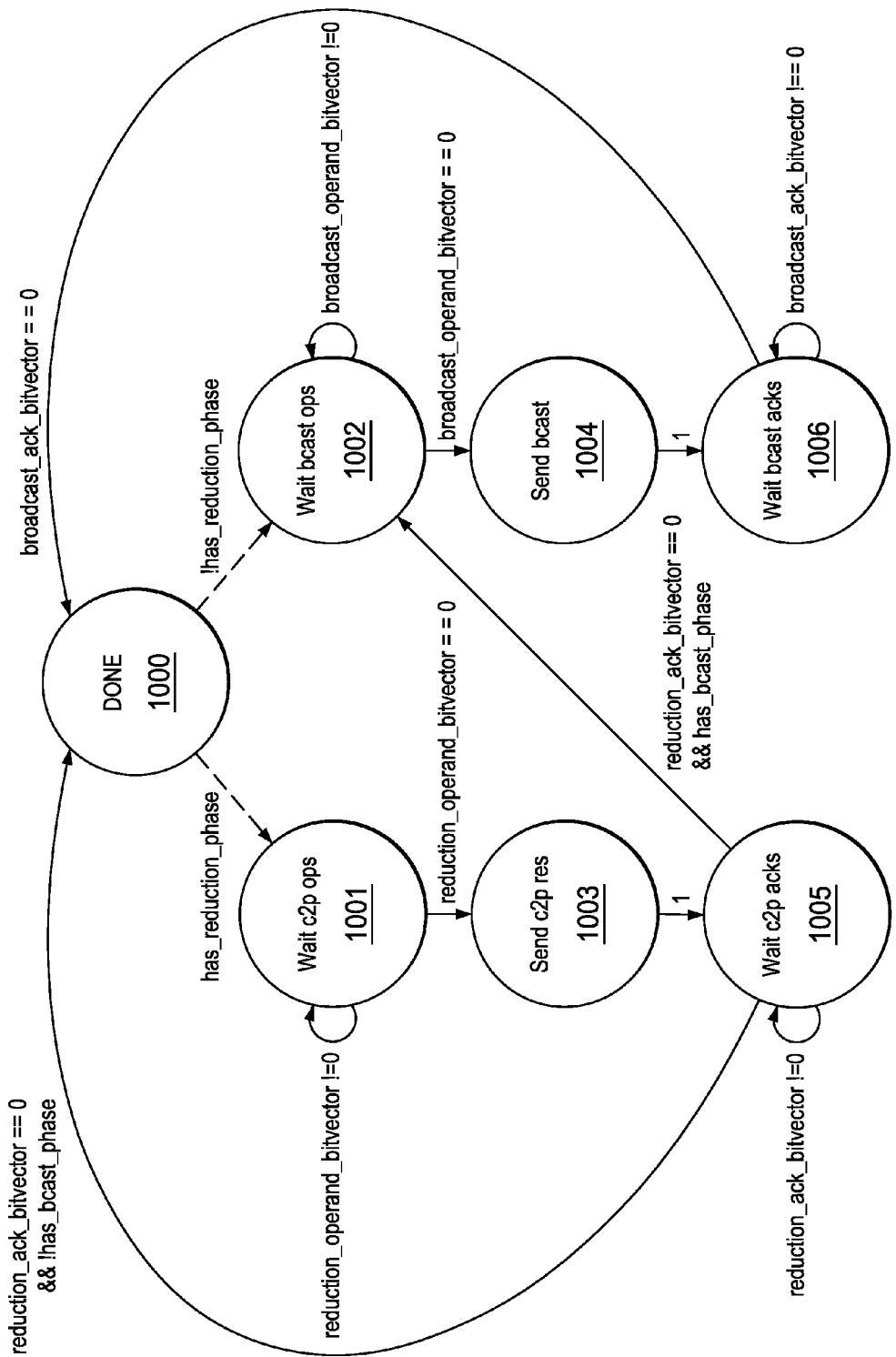
Figure 10C:
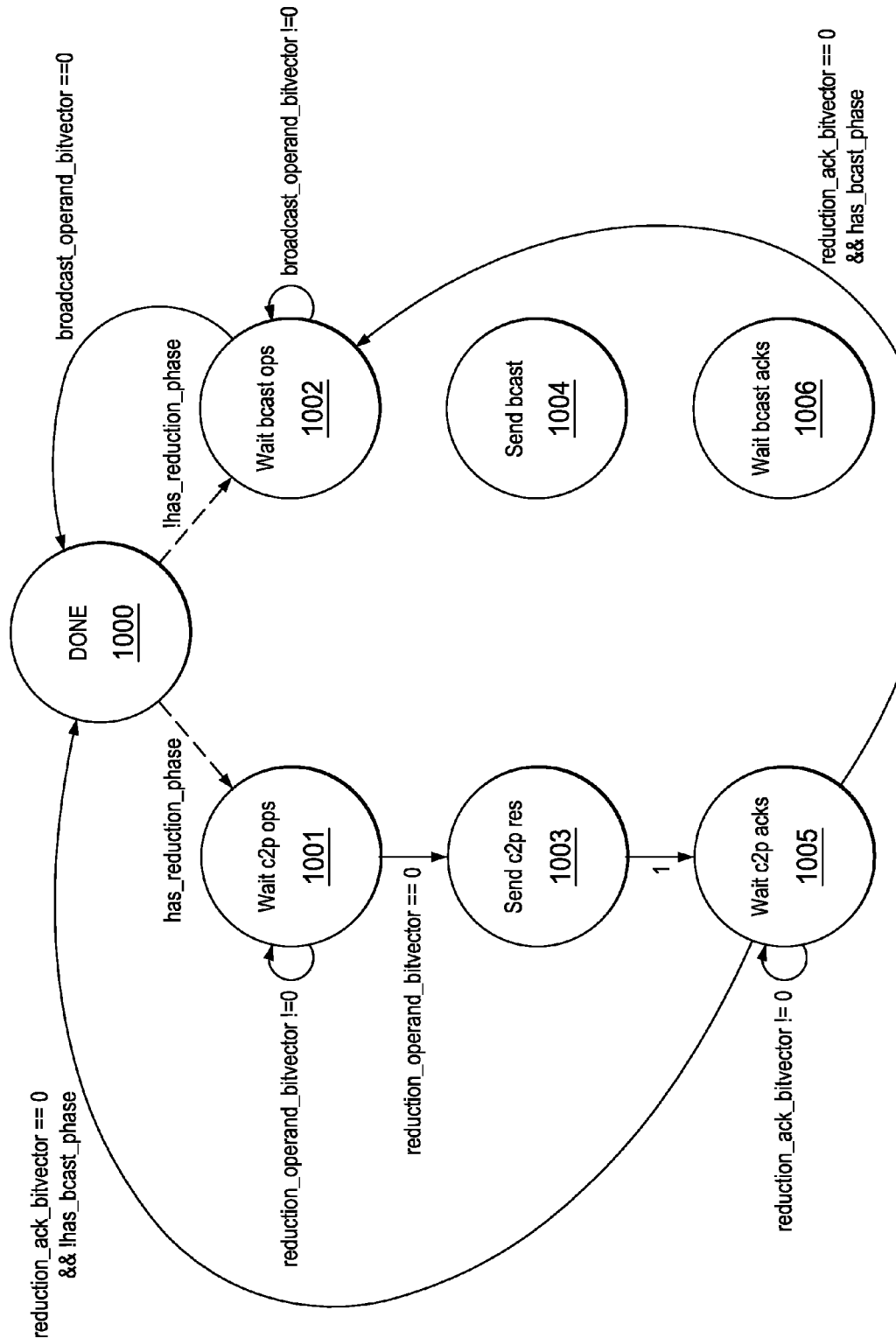

FIGS. 10A-C illustrate state transition diagrams specifying the operation of state machines for different roles in the VCI hierarchy. In particular, FIG. 10A illustrates the operation of a root PE having children but no parents; FIG. 10B illustrates the operation of an internal PE having both children and parents; and FIG. 10C illustrates the operation of an edge PE having a parent but no children.

As illustrated, in one embodiment, a state machine 811-817 is in a "Done" state 1000 when no collective operation is outstanding. A setup instruction forces a core's state machine to a state where it waits for operand(s) for an upcoming reduction operation 1001 or broadcast operation 1002. Once received, the state machine sends its own local reduction result 1003 to its parent ("c2p" stands for "child-to-parent" in FIGS. 10A-C) or sends a broadcast result 1004 to it children. Thus, the results are sent to the next receiver higher or lower in the VCI hierarchy depending on the type of operation (i.e., broadcast or c2p). The PE then waits for the child-to-parent acknowledgement 1005 or broadcast acknowledgement 1006 for all packets.

By forcing hardware to wait for acknowledgements as described above, these embodiments of the invention achieve pipelined collective operations with minimal hardware overhead. For reduce-2-all operations, the state machine may first perform a reduction operation followed by a broadcast operation.

Because FIG. 10A illustrates the operation of a root PE, which has no parents, the send child-to-parent response 1003 and wait for child-to-parent acknowledgement 1005 states are not utilized. Rather, only broadcast states 1004 and 1006 are used to broadcast results to children and wait for acknowledgements, respectively.

Because FIG. 10B illustrates the operation of an internal node, which has both parents and children, the send child-to-parent response 1003 and wait for child-to-parent acknowledgement 1005 states are utilized (for communicating collective results up the hierarchy). In addition, the broadcast states 1004 and 1006 are used to broadcast results to the children PEs and wait for acknowledgements, respectively.

Because FIG. 10C illustrates the operation of an edge node, which a parent but no children, the send child-to-parent response 1003 and wait for child-to-parent acknowledgement 1005 states are utilized (for communicating collective results up the hierarchy). However, the broadcast states 1004 and 1006 are not needed to broadcast results to children PEs and wait for acknowledgements, respectively (i.e., because the PE has no children).

In one embodiment, the software protocol requires software to complete sequences, which ensures the finite hardware buffering is never oversubscribed. In particular, the initiate operation tells hardware that the PE is ready to participate in the specified DCID/collective and provides the PE's contribution to the computation. The wait operation tells the hardware to wait until this PE's state machine has completed its role in the specified collective. Once wait finishes, the PE is free to start another collective using the same setup even though the prior collective may still be in flight elsewhere on the machine, thereby efficiently utilizing the PEs processing resources.

The setup operation identifies collectives and their topology (as previously discussed) and the teardown operation deallocates resources when a PE is done participating in the collective. Thus, using these techniques, it is possible to setup a PE, do a series of collectives, teardown the collective, even with the collective still active in other parts of the machine, setup a new collective using other PEs, some of which may be executing a prior collective, and initiate operations on that collective.

Figure 11:
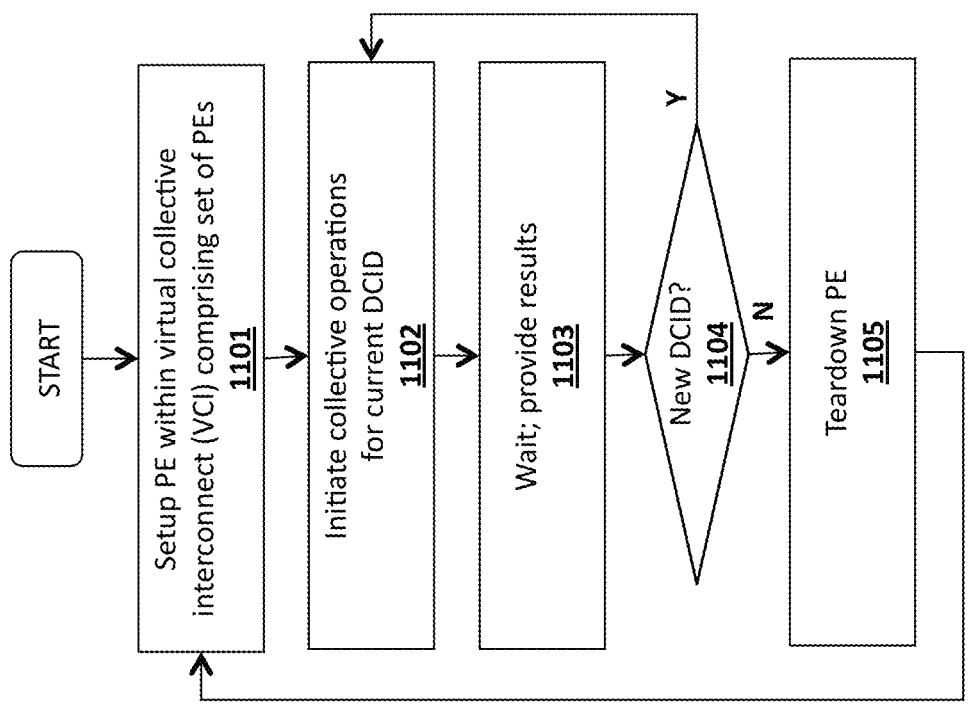
FIG. 11 illustrates a method in accordance with one embodiment of the invention.

A method in accordance with one embodiment of the invention is illustrated in FIG. 11. The method may be implemented on an architecture such as those described above. However, the underlying principles of the invention are not limited to any particular processor architecture.

At 1101 a setup operation is performed to configured the PE within a particular virtual collective interconnect comprised of a set of PEs. For example, as mentioned above, the PE may be configured to fit within a particular location of a binary tree structure such as that shown in FIG. 8. To do so, the PE will be informed of parent PEs (if any) and child PEs (if any), and a current DCID all provided by software. In addition, the setup operation specifies the collective operation to be performed (e.g., reduction, broadcast, barrier, allreduce, parallel prefix, etc), and the computational operation (add, or, xor, mul, etc).

At 1102, the initiate operation indicates that the local PE is ready to begin participating in the collective operation and supplies its input (if any) for the operation. For some operations, only one PE executes initiate (broadcast); for others (reduction, barrier, and allreduce), software must initiate on all PEs in the collective.

At 1103, the wait operation causes the PE to retrieve any result or partial result from the operation and write it to a processor register. As mentioned, all PEs must wait to complete a collective operation.

At 1104, software decides whether to use the same topology to pipeline a sequence of collective operations of the same topology and operation. If so, hardware generates a new DCID based on the original DCID (e.g., incrementing to a next value) and a new initiate operation uses the new DCID. If not, then at 1105 software can initiate a teardown to deallocate/deactivate the collective operation. As indicated, the process may then return to 1101 as a new setup is performed on the PE (i.e., allocating the PE to a new DCID).

The embodiments described herein do not require global communications to start a new collective. The unique DCID provided by software is used by hardware to detect when a PE is trying to pass a value to a PE that has not yet joined the collective. The combined hardware and software protocols ensure no global synchronizations are needed, even when moving a PE among collectives with different members, topologies, or operations. If a PE's state machine receives a collective message for something other than its current DCID, it may reject the message with a "retry-later" sent to the message source. One embodiment which never uses "retry" messages would require larger PE-local buffering or global synchronizations between changes in collective topology. In particular, after a teardown and while setting up a new partition, software must choose a DCID that will not conflict with any DCID's that may be in use on any of the PEs in the new collective.

In one embodiment, a PE may exit a collective and perform independent work. When the collective would block for an exited sender, hardware uses a default identity value. For example, if data being fed to the collective is distributed asymmetrically across PEs, then a PE may "run out" of data before the collective across all PEs has finished. The out-of-data PE could execute SW to explicitly provide identity values, or it can provide an identity value to be used at each step, and then the PE can exit the collective and go perform other work. In a further refinement, once all leaf nodes of a PE and the PE itself switch to using identity values, they may tell the parent it can provide the identity value automatically. For example, in FIG. 8, once PE 807 exits the collective, there is no need to explicitly forward the identity, instead the parent PE 804 can use the identity value directly In another embodiment, a PE forwards values without waiting for all senders to provide values. In this embodiment, missing senders may contribute a default identity value.

The described embodiments avoid setup barriers as well as requiring the PEs to explicitly manage them during execution. Collectives are implemented with an asynchronous state machine. As such, the local PE initiates communication, then can go do other work without needing to manage communication. Software does not interact further until it requests the result. Software can choose to 'wait' or 'poll' to see if a collective is complete. This transforms the requirement for a global barrier/synchronization in to system that uses a data-flow "wavefront" of results that ripple across the machine—never requiring a complete synchronization to be surfaced.

Collectives may also be implemented directly in the ISA to minimize startup overhead.

Collections of PEs may be setup, torn-down, modified, and collective operations commenced without any global communications before or after and without any software-based buffer space allocation or preparation. Avoiding global communication is beneficial because setup overheads (e.g., global barriers) have limited the usability of prior systems due to such inefficiencies. Software may need to ensure a well-defined sequence of collectives to avoid circular dependences, but this requirement is no different from that required to write a parallel program on any other machine.

Collectives may also be executed across arbitrary subsets of PEs at the software's discretion. There are no limits to which cores can or cannot participate. Subset flexibility is atypical of hardware-based collective solutions. The approach described herein depends only on an interconnect that can route collective messages between PEs, and PEs that are uniquely identifiable by software.

A series of collectives (even all-reduce operations) can be pipelined across the collection of PEs. Given resources of just a single collective in hardware, the embodiments described herein allow collectives to be pipelined (wavefront) across the system without increasing the amount of storage or buffering required.

As mentioned, the above features may use only a constant amount of hardware buffering state per PE, regardless of how many collectives are in flight and how many PEs are in the collective. This means collectives on large machines can be implemented using a small number of internal registers and without further memory or cache. Furthermore, the described embodiments need no software buffering of message state other than the unique IDs of collectives in progress. Consequently, these embodiments can operate independently of memory architecture, cache coherence, and physical delivery of messages.

The collective hardware may support an optional "default child value" mode which allows asymmetric computations to complete on a PE, with hardware providing an identity value for the collective rather than requiring software to "feed" identities.

The collective hardware may support an optional continuous streaming mode that allows continual update of results fed with a stream of inputs for reductions plus identities, rather than waiting for all leaf nodes as in the "discrete" mode.

In the event of an error or fault, in many cases the operation can simply be restarted and/or retried.

Various alternate/additional embodiments of the invention are contemplated including the following:

(1) Using more collective state storage to allow even more collectives to be in flight in the system (e.g., adding parallel execution of collectives to the pipelined design described earlier). For example, the low order bits of the DCID may be used to indicate which set of bookkeeping resources a particular collective should use.

(2) Programming the state machine using techniques other than dedicated processor instructions or argument/operand specifics described above.

(3) Providing a broader set of collective operations beyond those specified above (e.g., to any appropriately associative/commutative type of algebraic operations)

(4) Expanding the virtual topology to any fixed-dimension topology.

(5) The development of various algorithms for running the state machine, ordering requests, or handling multiple "instances" of the state machine.

(6) The use of altered hardware state machines that accomplish effectively the same computation.

(7) The PEs described above may be any type of active agent that is fetching and executing instructions (e.g., "nodes," "cores," etc).

(8) The use of altered instructions and protocols that accomplish effectively similar operation.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
a plurality of processor elements (PEs);
collective interconnect logic to dynamically form a virtual collective interconnect (VCI) between the PEs at runtime without global communication among all of the PEs, the VCI defining a logical topology between the PEs in which each PE is directly communicatively coupled to a only a subset of the remaining PEs; and
execution logic to execute collective operations across the PEs, wherein one or more of the PEs receive first results from a first portion of the subset of the remaining PEs, perform a portion of the collective operations, and provide second results to a second portion of the subset of the remaining PEs.

2. The apparatus as in claim 1 wherein the VCI defines a hierarchical topology between the PEs comprising a binary tree in which at least some PEs have child PEs and parent PEs.

3. The apparatus as in claim 2 wherein at least one PE comprises a root PE having children PEs but no parent PEs.

4. The apparatus as in claim 3 wherein some PEs comprises edge PEs having a parent PE but no children PE.

5. The apparatus as in claim 1 wherein the collective interconnect logic includes a setup operation executable by the PEs to dynamically form the VCI, the setup operation causing PEs to store ID codes identifying any children PEs and/or parent PEs and a code to indicate a type of collective operation to be performed.

6. The apparatus as in claim 2 wherein the collective operation comprises a reduction.

7. The apparatus as in claim 6 wherein to execute its role in the reduction operation, a PE waits to receive first results from its children PEs, combines the first results with its own data, generates a second result, and provides the second result to a parent PE.

8. The apparatus as in claim 7 wherein the parent PE uses the second result to generate a third result and provides the third result to its parent PE.

9. The apparatus as in claim 2 wherein at least one of the collective operations comprises a broadcast operation in which data is broadcast from parent PEs to children PEs.

10. The apparatus as in claim 1 wherein at least one of the collective operations comprises a parallel prefix operation.

11. The apparatus as in claim 1 wherein at least one of the collective operations comprises an all-reduction operation.

12. The apparatus as in claim 1 wherein at least one of the collective operations comprises a barrier operation forcing all PEs to reach a common point in execution before all can proceed.

13. The apparatus as in claim 1 wherein each PE utilizes a constant amount of state storage to perform the collective operations regardless of the size of the logical topology.

14. The apparatus as in claim 5 wherein the collective interconnect logic includes an initiate operation executable by the PEs to indicate that a PE is ready to begin participating in the collective operations following completion of the locally executed setup operation.

15. The apparatus as in claim 14 wherein the collective interconnect logic includes a wait operation executable by the PEs to retrieve any result or partial result from the collective operation and write it to a register.

16. The apparatus as in claim 15 wherein the collective interconnect logic includes a next operation executable by the PEs to begin a new iteration of one of the collective operations.

17. The apparatus as in claim 16 wherein the collective interconnect logic includes a teardown operation executable by the PEs to deallocate a PE from the logical topology.

18. The apparatus as in claim 1 wherein the execution logic comprises a state machine within each PE to control the collective operations across the PEs.

19. The apparatus as in claim 18 wherein the state machine enters into a first state for receiving the first results from the first portion of the subset of the remaining PEs, a second state to perform the portion of the collective operations, and a third state to provide the second results to the second portion of the subset of the remaining PEs.

20. The apparatus as in claim 1, wherein the value provided by a PE or child node can be a designated default or identity value, instead of being provided explicitly.

21. The apparatus as in claim 20, where a subgraph with all PEs exited from a collective need not communicate the default or identity value on each collective operation, but rather the default or identity value (or the need for same, if the value is already known) is communicated once to the parent and the parent can subsequently provide the value without communicating with the child PEs.

22. A method comprising:
dynamically forming a virtual collective interconnect (VCI) between a plurality of processor elements (PEs) at runtime without global communication among all of the PEs,
defining a logical topology between the PEs in which each PE is directly communicatively coupled to a only a subset of the remaining PEs; and
executing collective operations across the PEs, wherein one or more of the PEs receive first results from a first portion of the subset of the remaining PEs, performs a portion of the collective operations, and provides second results to a second portion of the subset of the remaining PEs.

23. The method as in claim 22 further comprising:
defining a hierarchical topology between the PEs comprising a binary tree in which at least some PEs have child PEs and parent PEs.

24. The method as in claim 23 wherein at least one PE comprises a root PE having children PEs but no parent PEs.

25. The method as in claim 24 wherein some PEs comprises edge PEs having a parent PE but no children PE.

* * * * *